United States Patent
Diliscia et al.

(10) Patent No.: US 7,866,072 B2
(45) Date of Patent: Jan. 11, 2011

(54) GAME ANIMAL TAG AND METHOD OF USE

(76) Inventors: Silvio A. Diliscia, 219 Wallace Dr., Monroeville, PA (US) 15146; Ronald E. Mooney, Jr., 4619 Main St., Munhall, PA (US) 15120

( * ) Notice: Subject to any disclaimer, the term of this patent is extended or adjusted under 35 U.S.C. 154(b) by 0 days.

(21) Appl. No.: 12/401,950

(22) Filed: Mar. 11, 2009

(65) Prior Publication Data

US 2010/0229435 A1   Sep. 16, 2010

(51) Int. Cl.
G09F 3/00   (2006.01)

(52) U.S. Cl. .................. 40/304; 40/665; 40/661.09; 40/654.01

(58) Field of Classification Search .......... 40/300–304, 40/633
See application file for complete search history.

(56) References Cited

U.S. PATENT DOCUMENTS

| | | | |
|---|---|---|---|
| 2,548,104 A | 4/1951 | Frison | |
| 3,468,050 A | 9/1969 | Pool | |
| 4,512,096 A * | 4/1985 | Heidecker | 40/304 |
| 4,956,931 A * | 9/1990 | Selke | 40/633 |
| 5,269,564 A | 12/1993 | Arnt | |
| 5,279,057 A * | 1/1994 | Melin et al. | 40/630 |
| 5,655,320 A | 8/1997 | Kazenski | |
| 6,006,460 A | 12/1999 | Blackmer | |
| 6,082,321 A * | 7/2000 | Kopec | 123/196 R |
| 6,085,449 A * | 7/2000 | Tsui | 40/1.6 |
| 6,317,030 B1 | 11/2001 | Magee | |
| 6,782,648 B1 * | 8/2004 | Mosher, Jr. | 40/633 |
| 6,799,389 B2 | 10/2004 | Wolfgang | |
| 2003/0015149 A1 | 1/2003 | Krey et al. | |
| 2007/0130813 A1 * | 6/2007 | Stacy | 40/633 |
| 2008/0061573 A1 | 3/2008 | Lamson et al. | |

* cited by examiner

*Primary Examiner*—Lesley Morris
*Assistant Examiner*—Christopher E Veraa
(74) *Attorney, Agent, or Firm*—James Ray & Assoc

(57) ABSTRACT

A game animal tagging apparatus includes a substantially transparent flexible plastic strip having a front side, a back side, and predetermined dimensions, with a pocket member disposed on a portion of the front side. The plastic strip has at least one wing portion and an adhesive covers at least 20 percent of the front side of the plastic strip, and a removable protective member covers at least all of the adhesive.

11 Claims, 3 Drawing Sheets

GAME ANIMAL TAG AND METHOD OF USE

FIELD OF THE INVENTION

The present invention relates, in general, to a tagging device for harvested game and, more particularly, this invention relates to an adhesive attachment system for identification tagging of game animals.

BACKGROUND OF THE INVENTION

Prior to the conception and development of the present invention, hunters harvesting game animals have had various methods of putting their identification tag on the dead game animal, but all having some drawbacks. With deer especially, the animal commonly must be dragged considerable distance through the woods before reaching and loading it onto a vehicle. The rocks, branches, and bushes encountered on the way tend to rip off many types of tags. In addition, rain or snow can get to the paper portion of the tag and make it unreadable.

There are numerous prior art examples of tags and tag holders for identifying animals, dead or alive. Patent examples can be found in U.S. Pat. Nos. 2,548,104, 3,468,050, 5,655,320, and 6,799,389. These all form a loop of some sort with a dangling tag portion, thereby exposing the identification portion to potential damage by snagging on or rubbing against tree branches, bushes, and rocks.

Arnt in U.S. Pat. No. 5,269,564 discloses a game kill tag holder that sandwiches the tag between two clear plastic sheets with multiple edge notches, but this combination is then tied to some body part of the dead animal with a cord through an aperture in one end of the tag. While Arnt's holder may protect the inserted hunter's tag from the weather, the dangling tag is still in jeopardy of getting snagged and ripped off as the animal is dragged.

Blackmer in U.S. Pat. No. 6,006,460 discloses a game tagging system that provides a sticky zone or pocket for holding a hunting license in one corner of a plastic strip. Various means of attaching this holder to a part of the dead animal are disclosed, but none adequately protect the game license very well from exposure to the elements, and the tag portion of the license holder is susceptible to being ripped from the attachment means for the holder. Adhesive backed transparent plastic pocket holders can be found among office supplies, but they all have the adhesive on the side opposite the pocket opening. As with the Blackmer device, this leaves the pocket opening exposed to moisture infiltration and for possible snagging on the surroundings.

SUMMARY OF THE INVENTION

The present invention provides a game animal tagging apparatus including a transparent flexible plastic strip having a front side, a back side, and predetermined dimensions, with a pocket member disposed on a portion of the front side. The plastic strip has at least one wing portion wherein an adhesive covers at least 20 percent of the front side only, and a removable protective member covers at least all of the adhesive. In a preferred embodiment, end tabs are left with no adhesive so as to facilitate both peeling off the protective member and eventually removing the tagging apparatus from the animal.

OBJECTS OF THE INVENTION

It is, therefore, one of the primary objects of the present invention to provide a durable yet inexpensive and convenient device for tagging dead game animals.

Another object of the present invention is to provide a tag holder for harvested game animals that is resistant to weather and snagging.

Still another object of the present invention is to provide a dead game tagging system that is readily adaptable to various animals and animal parts, such as legs, ears, and antlers.

Yet another object of the present invention is to provide a tagging device for harvested game that enables visibility of the license or game tag on the animal while still being water resistant.

An additional object of the present invention is to provide a game tagging method that is not prone to being ripped off the harvested game if the animal is being dragged, yet can be easily removed when desired.

Yet still another object of the present invention is to provide a simple convenient method for securely attaching a printed or written tag form to harvested game animals.

In addition to the various objects and advantages of the present invention described with some degree of specificity above, it should be obvious that additional objects and advantages of the present invention will become more readily apparent to those persons who are skilled in the relevant art from the following more detailed description of the invention, particularly, when such description is taken in conjunction with the attached drawing figures and with the appended claims.

Figure 1:
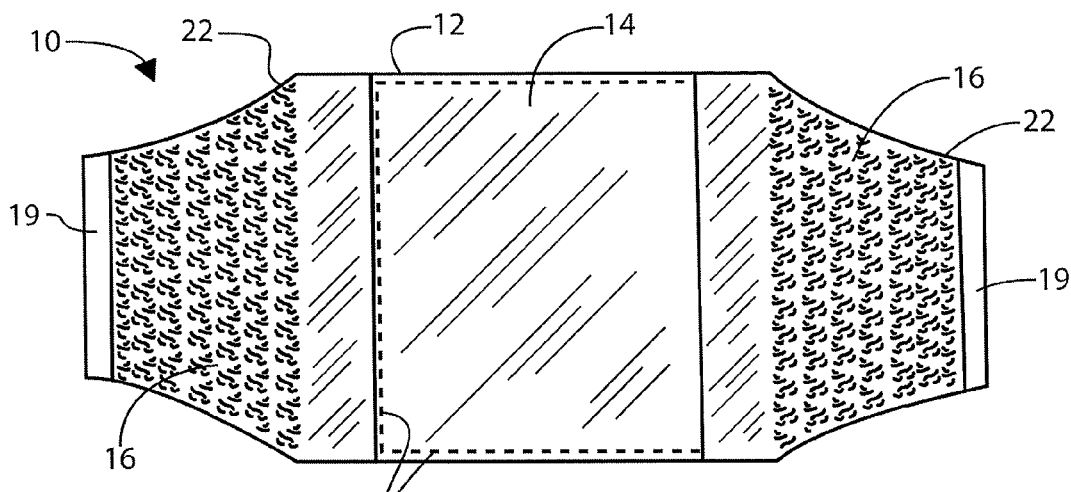
FIG. 1 is a top plan view of the present invention.

DETAILED DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Figure 2:
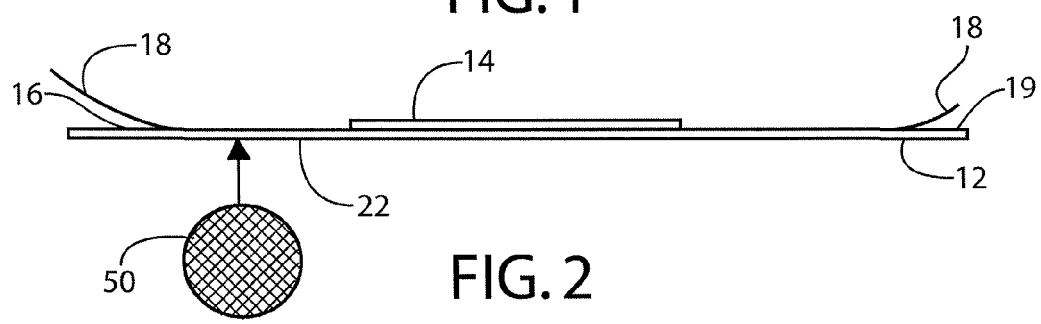
FIG. 2 provides a side elevation view of the present invention.

Referring initially to FIG. 1 and FIG. 2, the present invention is generally shown as 10, and is depicted in a top plan view and a side view. A thin flexible plastic strip 12 typically is about one to eight mils thick, five to eight inches wide, and two to four inches high with a front side and a back side. The type of plastic is typically one of polyethylene, polypropylene, or plasticized polyvinyl chloride (PVC), and preferably is elastic or stretchable to some extent. A flexible plastic pocket 14 is formed by attaching a rectangular plastic film on the front side in the central area of the plastic strip 12 with seams 24. The rectangular piece is attached along three edges 24 to the flexible plastic strip 12. The rectangular plastic film may be transparent, translucent, or opaque. Adjacent opposing sides of the flexible pocket 14 are wing portions 22. An area of the surface of the wing portions 22 is covered by an adhesive 16. In the preferred embodiment, at least 20% of the wing portions are covered with the adhesive area 16. The adhesive area 16 is on the same side as the pocket 14 opens. This is a key distinction from the prior art as this allows the pocket 14 to be covered and the opening sealed as the strip 12 is wrapped around an animal leg or antler. Preferably, end tabs 19 are disposed adjacent to wing portions 22. However, end tabs 19 are preferably not covered with an adhesive to aid in grasping the end tabs 19 to remove the adhesive covering film 18, and to remove the tag from the animal. The entire back side of the strip 12 is not covered with an adhesive and is optionally and preferably the color orange, designated by 50. This color is also preferred for the covering members 18. The protective member 18 preferably will extend beyond the end tab 19 to facilitate removal.

Figure 3:
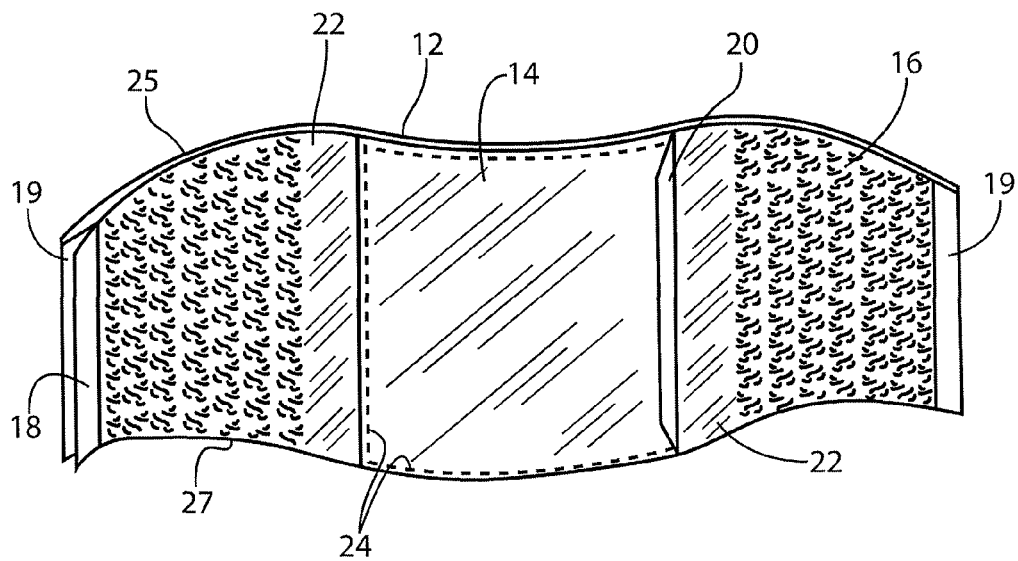
FIG. 3 provides a front side perspective view of a preferred embodiment of the present invention.
Figure 4:
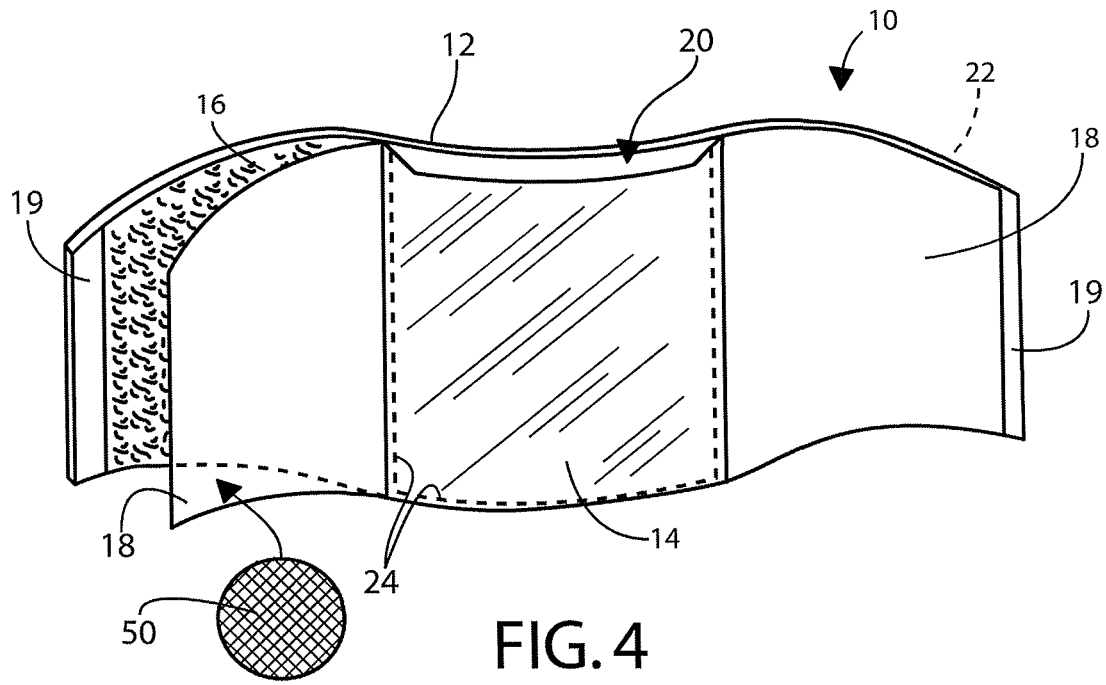
FIG. 4 provides a front side perspective view of an alternative embodiment of the present invention.
Figure 5:
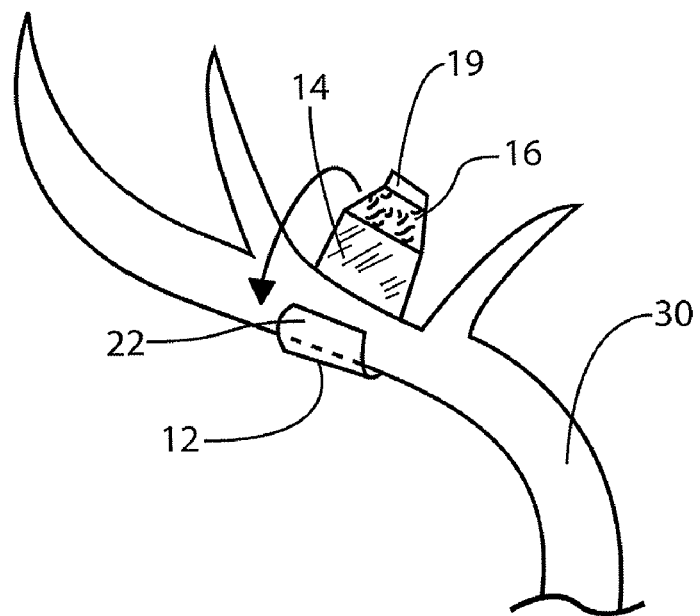
FIG. 5 is a perspective view illustrating the attachment of the present invention to deer antlers.
Figure 6:
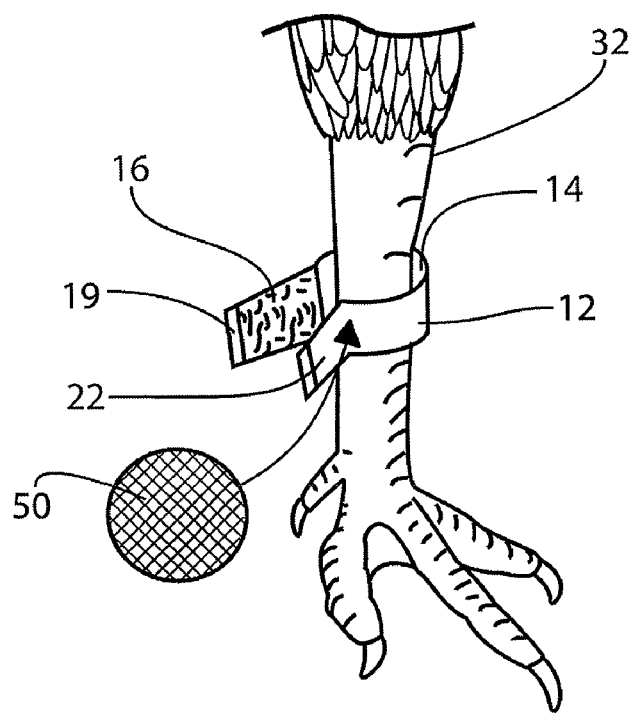
FIG. 6 provides a perspective view of an alternative attachment method illustrated with a turkey leg.

FIG. 3 provides a perspective view of the present invention as viewed from a front side where the pocket portion 14 is accessible. The flexible plastic strip 12 has two wing portions 22 and a central zone with a flexible pocket member 14 having an opening 20 for sliding in written or printed tags. Adhesive 16 covers a substantial area of the wing portions 22 on the same side as the pocket opening 20 with the adhesive area 16 covering at least a substantial portion of the area from the top edge 25 to the bottom edge 27. The adhesive area 16 preferably does not cover the end tabs 19 which are uncovered by adhesive between 0.2 and 0.5 inches from the end tabs 19 edge. Preferably the wing portions 22 are tapered toward the shorter end tabs 19. FIG. 4 provides a front perspective view of an alternative embodiment of the present invention, generally shown as 10. This embodiment is very similar to that shown in FIG. 3 except that the pocket portion 14 opening 20 is adjacent the longer top edge of the plastic strip 12. The main body is a flexible plastic strip 12 being substantially transparent, although it may be tinted. A flexible pocket portion 14 is formed in a central portion by attaching a rectangular film along three seams 24. Adjacent the pocket portion, two wing portions 22 extend in opposite directions. At least 20% of the front side wing portions are covered with an adhesive area 16, which is covered by removable protective members 18, which may be clear or opaque film. The protective members 18 may also take the form of a sheet larger than two of the flexible strips to which at least two strips are removably attached, much like labels would be attached to a smooth backing sheet. The end tabs 19 are not covered with adhesive to facilitate grasping. The pocket opening 20 may be along the top edge 25 in any of the embodiments FIG. 5 and FIG. 6 illustrate two methods of use for the present invention. In FIG. 5, the flexible strip 12 with a hunter's tag in pocket 14 is being wrapped around a deer antler 30. Initially, protective member 18 is removed from the flexible strip 12. One exposed area of adhesive 16 is adhered to the deer antler. The width of strip 12 has been appropriately sized and tapered for fitting between points in the deer antler 30. The back side of one wing portion 22 is facing outward as the front side adhesive 16 of wing portion 22 is adhered to the antler 30. The flexible plastic strip 12 with the pocket 14 facing the antler 30 is wrapped around the antler 30 and this continues until all of the adhesive 16 is adhering to the antler 30 or the back side of the strip 12. One of the end tabs 19 remains free of adhesive for grasping to remove the flexible plastic strip 12.

FIG. 6 illustrates an alternative method of attaching the present invention, this time to an animal leg, more particularly a turkey leg 32. After the protective members have been removed, the pocket member 14 with a tag or license inside is held against the animal part and the two adhesive-covered wing portions 22 are pressed together to seal the strip 12 in place around the animal leg 32. In this case, both end tabs 19 are accessible for grabbing to peel the tag 12 off. This method could also be used for attaching to an animal's ear after cutting a slit in the ear. In both of these examples, the substantially transparent nature of the present invention allows one to observe that a license tag is inside the pocket. Preferably, but optionally, at least a portion of the strip 12 is a highly visible color like orange, designated by 50, to facilitate safety and seeing its location.

Figure 7:
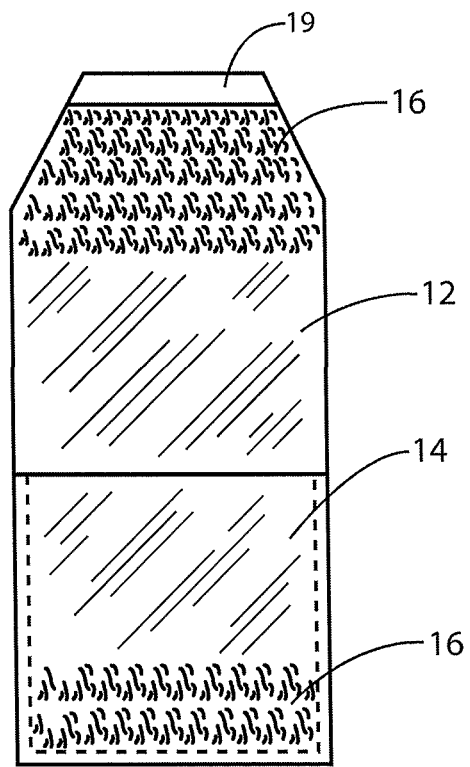
FIG. 7 is a front elevation view of an alternative embodiment of the present invention.

FIG. 7 provides an elevation view of another alternative embodiment of the present invention. In this instance, the flexible plastic strip 12 has a pocket 14 disposed near one end and adhesive covered portions 16 on at least both ends on the same front side that the pocket 14 opens. Except for the non adhesive tab 19, the adhesive 16 covers at least 20% and up to 100% of the present invention.

While a presently preferred and various alternative embodiments of the present invention have been described in sufficient detail above to enable a person skilled in the relevant art to make and use the same, it should be obvious that various other adaptations and modifications can be envisioned by those persons skilled in such art without departing from either the spirit of the invention or the scope of the appended claims.

What is claimed is:

1. A game animal tagging apparatus comprising:
   a) a substantially transparent flexible plastic strip having a front side, a back side, and predetermined dimensions;
   b) a pocket portion disposed on said front side of said plastic strip and formed by attaching a rectangular film along three edges of said rectangular film to said plastic strip;
   c) at least one wing portion of said flexible plastic strip disposed adjacent said pocket portion of said flexible strip;
   d) at least two adhesive areas covering at least 20 percent of said front side adjacent opposing ends of said flexible plastic strip; and
   e) at least one removable protective member covering at least said adhesive area on said at least one wing portion.

2. The game animal tagging apparatus, according to claim 1, wherein said flexible plastic strip further includes at least one end tab not covered with adhesive adjacent a wing portion of said flexible plastic strip.

3. The game animal tagging apparatus, according to claim 1, wherein said predetermined dimensions of said flexible plastic strip are a thickness between about one and eight mils, a width between about two and four inches, and a length between about three and eight inches.

4. The game animal tagging apparatus, according to claim 1, wherein the color of said back side of said flexible plastic strip is orange.

5. The game animal tagging apparatus, according to claim 1, wherein said flexible plastic strip is one of stretchable and elastic.

6. The game animal tagging apparatus, according to claim 1, wherein said pocket portion of said front side is disposed substantially central to said front side.

7. The game animal tagging apparatus, according to claim 1, wherein the color of said at least one removable protective member is orange.

8. The game animal tagging apparatus, according to claim 1, wherein at least an end of said at least one wing portion is tapered.

9. The game animal tagging apparatus, according to claim 1, wherein said flexible plastic strip is one of polyethylene, polypropylene, and plasticized polyvinyl chloride.

10. A method of securing a hunter's license tag to a harvested game animal comprising the steps of:
   a) providing a flexible transparent plastic strip having a pocket portion disposed on a front side;
   b) providing said plastic strip with at least one wing portion;
   c) providing said at least one wing portion with a first adhesive area covering at least a portion of said wing portion;
   d) providing a second adhesive area on an opposing portion of said front side;
   e) providing said adhesive areas with removable protective members;
   f) placing a hunter's game identification tag inside said pocket portion;
   g) removing said removable protective members;
   h) locating an elongated portion of such harvested game animal;
   i) adhering one of said first and second adhesive areas of said front side onto said elongated portion with said pocket member facing said elongated portion;
   j) wrapping a remainder of said flexible plastic strip around said elongated portion, and
   k) adhering an opposing adhesive-covered area of said front side against at least one of said flexible plastic strip and said elongated portion of such harvested game animal.

11. The method of securing, according to claim 10, wherein said wrapping of said plastic strip around said elongated member further includes overlapping portions of said flexible plastic strip.

* * * * *